(12) United States Patent
Pedlar et al.

(10) Patent No.: US 10,502,174 B2
(45) Date of Patent: Dec. 10, 2019

(54) STOP-START SYSTEM (71) Applicant: FORD GLOBAL TECHNOLOGIES, LLC, Dearborn, MI (US)

(72) Inventors: Christopher Edward Pedlar, Chelmsford (GB); David Hesketh, Ingatestone (GB)

(73) Assignee: Ford Global Technologies, LLC, Dearborn, MI (US)

( * ) Notice: Subject to any disclaimer, the term of this patent is extended or adjusted under 35 U.S.C. 154(b) by 34 days.

(21) Appl. No.: 15/934,216

(22) Filed: Mar. 23, 2018

(65) Prior Publication Data
US 2018/0274510 A1 Sep. 27, 2018

(30) Foreign Application Priority Data
Mar. 24, 2017 (GB) .................... 1704655.8

(51) Int. Cl.
F02N 11/08 (2006.01)

(52) U.S. Cl.
CPC ...... *F02N 11/0822* (2013.01); *F02N 11/0825* (2013.01); *F02N 11/0829* (2013.01); *F02N 2200/023* (2013.01); *F02N 2200/061* (2013.01); *F02N 2200/0801* (2013.01); *F02N 2200/0804* (2013.01); *F02N 2200/101* (2013.01); *F02N 2200/102* (2013.01); *F02N 2200/103* (2013.01)

(58) Field of Classification Search
CPC ............. F02N 11/0822; F02N 11/0829; F02N 11/0825; F02N 2200/061; F02N 2200/101; F02N 2200/102; F02N 2200/103; F02N 2200/023; F02N 2200/0804; F02N 2200/0801; B60W 30/18018; Y02T 10/48

USPC .................. 123/179.3, 179.4; 701/112, 113
See application file for complete search history.

(56) References Cited

U.S. PATENT DOCUMENTS

| 2014/0039773 | A1 | 2/2014 | Bureau et al. |
| 2014/0081561 | A1 | 3/2014 | Be et al. |
| 2017/0260954 | A1* | 9/2017 | Hesketh ............... F02N 11/0822 |

FOREIGN PATENT DOCUMENTS

| FR | 2937091 | A1 | 4/2010 |
| FR | 2972029 | A1 | 8/2012 |
| FR | 2937091 | A1 * | 4/2016 | ............. F02N 11/10 |
| FR | 3026706 | A1 | 4/2016 |
| GB | 2512891 | A | 10/2014 |
| JP | 2000145492 | A | 5/2000 |
| JP | 2012082693 | A | 4/2012 |

OTHER PUBLICATIONS

Extended European Search Report for European Application No. 18150907.6 dated Jul. 25, 2018.
Great Britain Search and Examination Report for Great Britain Application No. 1704655.8 dated Aug. 10, 2017.

* cited by examiner

*Primary Examiner* — Hai H Huynh
(74) *Attorney, Agent, or Firm* — Brooks Kushman PC; David Kelley (57) ABSTRACT A vehicle and associated method of operating a vehicle having an engine, a user interface configured to select a start-stop mode, and a controller communicating with the engine and the user interface automatically shutdown and restart the engine, and inhibit the automatic engine shutdown or restart responsive to any of a first group of inhibitors, or alternatively, any of the first group and a second group of inhibitors depending on the start-stop mode selected via the user interface.

17 Claims, 1 Drawing Sheet

STOP-START SYSTEM

CROSS-REFERENCE TO RELATED APPLICATIONS

This application claims foreign priority benefits under 35 U.S.C. § 119(a)-(d) to Application GB 1704655.8 filed Mar. 24, 2017, which is hereby incorporated by reference in its entirety.

TECHNICAL FIELD

The present disclosure relates to a start-stop system for a motor vehicle and is particularly, although not exclusively, concerned with a start-stop system configured to allow fuel economy and emissions of the motor vehicle to be improved.

BACKGROUND

Automotive start-stop systems designed to reduce fuel consumption and $CO_2$ emissions work by automatically shutting the engine down when the vehicle is stationary. However, to try to balance fuel economy against other attributes such as climate comfort, start-stop systems typically include a number of 'inhibitor' signals that prevent the engine shutting down if it is needed for heating or cooling, or to reduced perceived 'busyness' of the system, etc.

Achieving an optimum balance between fuel economy and maintaining attributes such as consistent climate control that suits all customers in all situations is not possible since customer preferences vary wildly. Some customers prioritize fuel economy and would like the engine to shut down at every available opportunity, while others perceive start-stop as annoying and frequently disable it.

In current vehicles it is possible to disable the start-stop system and keep the engine running, using a disable switch, but there is no way to override the inhibitors to force the engine to shut down.

Vehicles, such as motor vehicles, may include a start-stop system configured to shut down an engine of the motor vehicle automatically when the engine is not required, e.g. when torque from the engine is not required to drive the vehicle, and to restart the engine automatically when desirable. For example, the engine may be shut down when the speed of the vehicle is below a threshold value, e.g. when the vehicle is stopped, and may be restarted automatically when a driver of the vehicle is preparing to move away after a stop or is attempting to accelerate the vehicle. Shutting down the engine in such circumstances reduces the idling time of the engine and improves the fuel efficiency and emissions of the motor vehicle.

When the engine of the motor vehicle is shut down by the start-stop system, the operation of one or more auxiliary systems of the motor vehicle, such as a climate control system of the vehicle, may be affected. It may therefore, be undesirable for the engine to be shut down automatically when such auxiliary systems are active. Furthermore, start-stop systems can sometimes be perceived as an annoyance by the driver, particularly if the start-stop system shuts down the engine too frequently or if the engine being shut down gives the impression that the vehicle cannot quickly move away from a stop.

Start-stop systems are often configured to balance the benefits to fuel consumption and emissions from shutting down the engine, with the annoyance that may be caused to the driver and the potential disruption to the operation of auxiliary systems of the vehicle.

SUMMARY

According to an aspect of the present disclosure, there is provided a start-stop system for a motor vehicle, the start-stop system being configured to control the operation of an engine of the motor vehicle when a predetermined engine start-stop condition is achieved, wherein the start-stop system is configured to shut down the engine according to an operating condition of the start-stop system, wherein the operating condition is one of: a first operating condition, in which the start-stop system is prevented from shutting down the engine of the motor vehicle when one or more critical inhibitors are active; and a second operating condition, in which the start-stop system is prevented from shutting down the engine of the motor vehicle when one or more critical or non-critical inhibitors are active. In other words, when the start-stop system is operating in the first operating condition, the start-stop system may ignore one or more non-critical inhibitors that may be active when determining whether to shut down the engine. The first operating condition can thereby be selected in order to force the start-stop system to shut down the engine when non-critical inhibitors are active.

The proposed solution offers the driver a means of overriding all but the most critical inhibitors and forcing an engine shutdown when the engine may otherwise be left running.

Examples of situations when this may be particularly useful are when the climate control system is inhibiting engine shut down but the customer is comfortable, when the engine has been restarted but the vehicle has not moved, when the ambient temperature is too hot or too cold but the driver is comfortable or during the engine warm up phase when there is no heat available from the engine to provide cabin heating.

Examples of critical inhibitors that should not be overridden are engine faults that would impair the ability to start the engine quickly or robustly, very low battery state of charge or anything risking vehicle safety. The present invention may provide a means of overriding some or all other, non-critical, inhibitors in order to maximize fuel economy.

There are various ways in which this override feature could be implemented. One possible implementation would be via a dedicated button. Alternatively, the button could be an existing button, such as a button for enabling or disabling the stop-start system. For example, the existing button may be a three-position switch. Alternatively, the existing button may be configured such that a long press or double press may implement the override feature. Alternatively, it may be realized via a 'soft button' in a "Human Machine Interface" (HMI) menu screen or even by an 'Easter egg' type maneuver such as tapping the clutch pedal twice.

The advantages of a dedicated button are that it doesn't require the customer to have any special knowledge or to read an owner guide to find the feature. However, finding a suitable location for another hard, e.g. physical, button on a vehicle instrument panel is often extremely difficult and runs counter to the trend of decluttering vehicle interiors. The alternative implementations therefore offer a method of implementing a useful feature without the attendant need for space or cost of a dedicated button.

The operating condition may be selectable by a user of the vehicle. For example, the operating condition may be selected by operating a switch or button provided on the vehicle, e.g. on a dash board or center console of the vehicle or on a control surface, such as a steering wheel, of the vehicle.

The driver may select the first operating condition to force the start-stop system to shut down the engine of the vehicle when one or more non-critical inhibitors may be active. In other words, the driver may select the first operating condition to override any non-critical inhibitors that may be active.

The second operating condition may be a default operating condition. When the first operating condition is selected, the start-stop system may determine whether to shut down the engine, e.g. depending only on whether any critical inhibitors are active, and may then return to the second operating condition. Alternatively, once the first operating condition has been selected, the start-stop system may remain in the first operating condition until an alternative operating condition, such as the second operating condition, is selected.

The start-stop system may be configured to shut down the engine when a velocity of the motor vehicle drops below a threshold value. Additionally, or alternatively, the start-stop system may be configured to shut down the engine when a brake pressure of a brake system of the vehicle exceeds a threshold value.

The start-stop system may be configured to restart the engine when the driver attempts to accelerate the vehicle or is preparing to accelerate the vehicle, e.g. when the driver activates a driving control indicating that the driver is preparing to accelerate. For example, the engine may be restarted when the driver depresses a clutch pedal of the vehicle whilst the vehicle is in a neutral gear or when the brake pressure is reduced below the threshold value, or a further threshold value.

The operating condition may be one of the first operating condition, the second operating condition and a third operating condition, in which the start-stop system may be prevented from shutting down the engine of the motor vehicle. In other words, when the start-stop system is in the third operating condition the start-stop system may be deactivated.

The critical inhibitors that may be active may correspond to one or more conditions of the motor vehicle that may prevent the engine from being restarted and/or that may affect safe operation of the motor vehicle. For example, the critical inhibitors that may be active may correspond to one or more of a low battery state, an engine fault, an engine starter fault, a battery fault and an inadequate brake servo vacuum level.

The non-critical inhibitors that may be active may correspond to conditions that may not prevent the engine from being restarted and/or that do not affect safe operation of the motor vehicle. The non-critical inhibitors may correspond to conditions of systems that do not affect the operation of the engine or safety of the motor vehicle and its occupants. For example, the non-critical inhibitors may relate to auxiliary systems of the motor vehicle. The non-critical inhibitors that may be active may correspond to one or more of: a climate control system of the vehicle being active, an ambient temperature of an interior of the vehicle being outside a predetermined range, an engine temperature being below a threshold value, the engine of the motor vehicle having recently been restarted, a media system of the vehicle being active and a power take-off port of the vehicle being in use.

The operating condition of the start-stop system may be selectable by an occupant of the motor vehicle, e.g. a driver or a passenger of the vehicle. For example, the start-stop system may comprise a multi-position switch configured to allow an occupant of the vehicle to select an operating condition of the start-stop system.

Alternatively, the operating condition of the start-stop system may not be selected using a dedicated, physical switch. For example, the operating condition of the start-stop system may be selected using a user interface of an on-board computing device, e.g. a trip computer of the vehicle. Additionally, or alternatively, the start-stop system may be configured to select the first operating condition of the start-stop system, or alternate between operating modes, following a predetermined atypical operation of a driving control of the vehicle, e.g. an operation of the driving control that the driver of the vehicle would not typically perform during normal driving. For example, the start-stop system may select the first operating condition following the driver rapidly depressing a clutch pedal twice while in a neutral gear.

Additionally, or alternatively, the operating condition of the start-stop system may be selected according to an operating condition of the motor vehicle. For example, if the vehicle is in a first operating condition, such as an economic operating condition, in which the systems of the vehicle are configured to improve or maximize the efficiency of the vehicle, the first operating condition of the start-stop system may be selected, e.g. automatically selected. Alternatively, if the motor vehicle is in a second operating condition, such as a high performance operating condition, in which the systems of the vehicle are configured to improve or maximize the performance of the motor vehicle, the second or third operating condition of the start-stop system may be selected, e.g. automatically selected.

The start-stop system may be configured to restart the engine of the motor vehicle automatically when a predetermined engine restart condition is achieved. For example, when a driver of the vehicle is attempting or preparing to accelerate the vehicle. The start-stop system may be configured to activate a non-critical inhibitor after the engine has been restarted. The non-critical inhibitor may be activated for a predetermined period of time or until the motor vehicle has accelerated above a threshold speed. If the start-stop system is operating in the second operating condition, the start-stop system may thereby be prevented from shutting down the engine again within the predetermined period of time, unless the vehicle is first accelerated to above the threshold speed.

According to another aspect of the present disclosure, there is provided a start-stop system for an engine assembly, the start-stop system comprising a controller configured to control the operation of the engine assembly when a predetermined engine start-stop condition is achieved, wherein the controller is configured to control the operation of the engine assembly at least partially according to an operating condition of the controller, the operating condition being one of: a first operating condition, in which the controller is prevented from controlling the operation of the engine assembly when one or more critical start-stop inhibitors are active; and a second operating condition, in which the controller is prevented from controlling the operation of the engine assembly when one or more critical and non-critical inhibitors are active.

A motor vehicle may comprise the above-mentioned start-stop system.

The motor vehicle may comprise one or more primary systems, including but not limited to an engine, an engine starter, a battery, a drive system and a brake system. Operation of the primary systems may enable operation of a powertrain, e.g. an engine and/or drive system of the motor vehicle, and/or brake system of the vehicle. The or each of the primary systems may be configured to activate a critical inhibitor of the start-stop system, e.g. provide a critical inhibitor signal to the start-stop system, when the primary system may be inactive, may have a fault or may be operating under a condition that may affect the operation of the powertrain or brake system of the motor vehicle or affect the safety of the vehicle or its occupants.

The primary systems may be further configured to activate non-critical inhibitors of the start-stop system, e.g. provide non-critical inhibitor signals to the start-stop system, when the primary systems are operating under a condition that may affect the operation of the vehicle, but that may not affect the operation of the powertrain or brake system, or affect the safety of the vehicle or its occupants.

The motor vehicle may further comprise one or more auxiliary systems, including but not limited to a climate control system, a media system and an accessory power supply system. The or each of the auxiliary systems may be configured to activate a non-critical inhibitor of the start-stop system, e.g. provide a non-critical inhibitor signal to the start-stop system, when the auxiliary system may be active, e.g. in use by an occupant of the vehicle.

The auxiliary systems may be configured to provide the non-critical inhibitor signals to the start-stop system when their operation, e.g. use by the occupant, may be affected by shutting down the engine.

According to another aspect of the disclosure, there is provided a method of operating a motor vehicle, the motor vehicle comprising an engine and a start-stop system, wherein the method comprises: selecting an operating condition of the start-stop system, wherein the operating condition is one of: a first operating condition, in which the start-stop system is prevented from shutting down the engine of the motor vehicle when one or more critical inhibitors are active; and a second operating condition, in which the start-stop system is prevented from shutting down the engine of the motor vehicle when one or more critical or non-critical inhibitors are active; and shutting down the engine of the motor vehicle automatically, according to the operating condition of the start-stop system.

The operating conditions may further include a third operating condition, in which the start-stop system is prevented from shutting down the engine of the motor vehicle. In other words, when the start-stop system is in the third operating condition the start-stop system may be deactivated.

The method may comprise restarting the engine automatically, e.g. when a pre-determined engine restart condition is achieved. For example, when a driver of the vehicle is preparing to accelerate the vehicle. The method may further comprise activating a non-critical inhibitor, e.g. a non-critical inhibitor indicating that the engine was recently restarted, after the engine has been restarted. The method may further comprise deactivating the non-critical inhibitor after a predetermined period of time or when the motor vehicle has accelerated to above a threshold velocity.

The operating condition of the start-stop system may be selected according to an operating condition of the motor vehicle.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

For a better understanding of the present invention, and to show more clearly how it may be carried into effect, reference will now be made, by way of example, to the accompanying drawings, in which:

DETAILED DESCRIPTION

As required, detailed embodiments are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to implement the embodiments and variations within the scope of the claimed subject matter.

Figure 1:
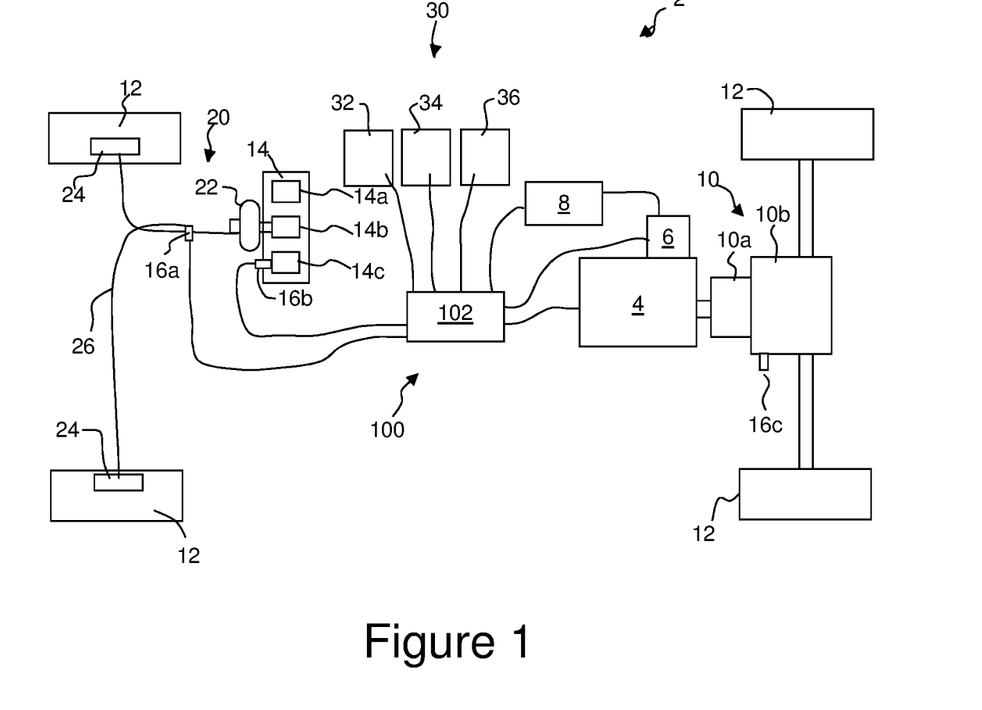
FIG. 1 is a schematic view of a vehicle assembly, according to arrangements of the present disclosure.

With reference to FIG. 1, a vehicle 2, such as a motor vehicle, comprises an engine 4, an engine starter 6, powered by a battery 8, and a drive system 10, configured to transmit power from the engine 4 to wheels 12 of the vehicle in order to drive the motor vehicle. In the arrangement show in FIG. 1, the drive system 10 is a conventional, e.g. non-hybrid, drive system. However, it is also envisaged that in other arrangements of the present disclosure, the drive system may be a hybrid drive system and the vehicle may comprise one or more electric motors configured to provide power to the drive system 10.

The drive system 10 may comprise a clutch 10a, configured to operatively couple the engine 4 to the drive system 10, and a gear box 10b, configured to allow a gear ratio between the engine 4 and the wheels 12 to be selectively varied.

The vehicle 2, further comprises a brake system 20 that can be operated by a driver of the vehicle 2 to decelerate the vehicle. In the arrangement depicted, the brake system 20 is a hydraulic brake system comprising a brake servo 22, brake calipers 24 and brake lines 26 configured to carry brake fluid between the brake servo 22 and the brake calipers 24. The brake system 20 may be configured such that a braking force provided by the brake system varies according to the pressure of brake fluid within the system, e.g. within the brake lines 26. Alternatively, the brake system 20 may comprise any other desirable type of brake system.

The vehicle 2 further comprises driving controls 14, such as an accelerator pedal 14a, a brake pedal 14b and a clutch pedal 14c. The driving controls 14 may be operated by a driver of the vehicle in order to control the operation of the vehicle. In particular, the driver may operate the accelerator pedal 14a to control the amount of torque provided by the engine, the clutch pedal 14c may be used to control the operation of the clutch 10a to couple and decoupled the engine 4 and the drive system 10, and the brake pedal 14b may be operated to control the braking force supplied by the brake system, e.g. by controlling the pressure of brake fluid within the brake system 20.

The vehicle 2 further comprises a start-stop system 100. The start-stop system is configured to control the operation of the engine 4 and the engine starter 6 to shut down the engine 4 automatically according to one or more predetermined start-stop conditions. For example, the start-stop system 100 may be configured to shut down the engine 4 when the velocity of the motor vehicle drops below a threshold value, e.g. when the vehicle stops. Additionally, or alternatively, the start-stop system 100 may be configured to shut down the engine 4 when the brake pedal 14b has been operated such that a braking force provided by the brake system 20 exceeds a threshold level.

The start-stop system 100 is further configured to restart the engine 4 of the motor vehicle 2 automatically, e.g. by operating the engine starter 6, according to one or more further predetermined start-stop conditions. Such further start-stop conditions may indicate that the driver is attempting or preparing to accelerate the vehicle. For example, the start-stop system 100 may be configured to restart the engine when the clutch pedal is depressed whilst the drive system 10 is in a neutral gear. Additionally, or alternatively, the start-stop system may be configured to restart the engine 4 when the brake pedal is being operated such that the braking force provided by the brake system 20 is less than the threshold level or a further threshold level.

The start-stop system 100 may comprise a controller 102 configured to determine when to shut down and restart the engine and to control the operation of the engine 4 and the engine starter 6 accordingly. The controller 102 may be a dedicated controller of the start-stop system 100. Alternatively, the controller 102 may be provided as part of one or more other systems of the vehicle, such as an engine assembly or powertrain of the vehicle. For example, the controller 102 may be an engine control unit or a powertrain control module. Alternatively, the controller 102 may be another controller of the vehicle, such as a body control module.

The vehicle 2 may comprise one or more sensors 16 configured to monitor the operation of the vehicle. The sensors 16 may be operatively coupled to the controller 102 and may provide sensor readings to the controller 102 for the start-stop system to determine whether the engine 4 should be shut down or restarted automatically. For example, as depicted in FIG. 1, the vehicle 2 may comprise a brake sensor 16a configured to determine the braking force being applied by the brake system 20. The brake sensor 16a may measure a pressure of brake fluid within the brake system 20 or may determine the position of the brake pedal 14b in order to determine the braking force being applied. The vehicle 2 may further comprise a clutch sensor 16b configured to determine when the clutch pedal 14c is being depressed to decouple the drive system 10 from the engine 4. The vehicle may further comprise a gear sensor 16c configured to determine a gear setting of the drive system 10, e.g. whether the gear box 10b of the drive system 10 is in a neutral gear.

The components and systems of the vehicle 2 described above, such as the engine 4, the engine starter 6, the battery 8 and the brake system 20, may be referred to as primary vehicle systems, as they directly relate to the operation of the engine 4 of the motor vehicle or to the safety of occupants of the motor vehicle during its operation.

If one or more of the primary systems of the vehicle is inactive, e.g. unable to operate, has a fault, or is operating under an operating condition that may affect safe, continued operation of the engine 4 and/or vehicle 2, it may be undesirable for the engine 4 of the vehicle to be shut down automatically. For example, shutting down the engine 4 in such circumstances may result in the start-stop system 100 being unable to restart the engine 4, which may result in the vehicle 2 being stranded in the road.

Each of the primary systems of the vehicle 2 may be configured to provide an inhibitor signal to the start-stop system 100, e.g. to the controller 102, to indicate that the start-stop system should not automatically shut down the engine 4 when the operating conditions of the system may affect safe, continued operation of the engine 4 and/or vehicle 2, e.g. following the engine being shut down.

The inhibitor signals generated by the primary systems of the vehicle 2 that may affect safe, continued operation of the engine 4 and/or vehicle 2 may be referred to as critical inhibitors. Critical inhibitors that may be active may correspond to a low charge state of the battery 8 or a battery fault, an engine fault, an engine starter fault, an inadequate brake servo vacuum level or any other fault or condition of the vehicle that may prevent the engine 4 from being restarted and/or may affect safe operation of the vehicle 2. The start-stop system 100 may be prevented from shutting down the engine 4 when one or more critical inhibitors are active.

It may also be undesirable for the engine to be automatically shut down when one or more of the primary systems are operating under other operating conditions that do not affect safe operation of the engine and/or vehicle. For example, during engine warm-up, when the engine 4 is operating at a temperature below a predetermined threshold temperature, it may be undesirable for the engine to be shut down automatically. Additionally, if the start-stop system 100 has recently, e.g. within a predetermined period of time, automatically restarted the engine, it may be undesirable for the engine to be shut down again even if a predetermined start-stop condition is met, e.g. in order to avoid the start-stop system acting as an annoyance to the driver.

Under such operating conditions, the primary systems may be configured to provide further inhibitor signals to the start-stop system. As operating under such conditions does not affect safe operation of the engine 4 and/or vehicle 2, the further inhibitor signals may be referred to as non-critical inhibitors. The start-stop system 100 may be prevented from shutting down the engine 4 when one or more non-critical inhibitors are active.

As depicted in FIG. 1, the vehicle 2 may further comprise one or more auxiliary systems 30, such as a climate control system 32, a media system 34 and a power supply system 36, configured to provide power to one or more occupant devices coupled to power take-off ports provided on the vehicle 2.

When the engine 4 of the vehicle is shut down, the operation of the auxiliary systems 30 may be affected, e.g. restricted. Hence, when one or more of the auxiliary systems 30 are active, it may be desirable to prevent the start-stop system 100 from automatically shutting down the engine 4.

The auxiliary systems 30 may each be configured to provide an inhibitor signal to the start-stop system 100, e.g. to the controller 102, when their operation may be restricted by shutting down the engine. For example, the climate control system 32 may provide an inhibitor signal when it is operating or when an interior temperature of the vehicle is outside a predetermined range of temperatures. As the auxiliary systems 30 do not affect continued, safe operation of the vehicle, the inhibitor signals generated by the auxiliary systems may be non-critical inhibitors.

Different drivers of the motor vehicle 2 may have different preferences for using the start-stop system 100. For example, some drivers may find the start-stop system 100 an annoyance and may be liable to deactivate the start-stop system. In order to deter such drivers from deactivating the start-stop system and to provide some benefits in fuel consumption and emissions from automatically shutting down the vehicle. The start-stop system 100 may be configured to prevent the engine 4 from being shut down automatically whenever a critical or non-critical inhibitor is active. In other words, the start-stop system may be configured to prevent the engine 4 from being shut down automatically whenever a primary or auxiliary system of the vehicle is providing or has provided a signal to the start-stop system 100 indicating that shutting down the engine 4 may detrimentally affect the operation of that system.

Other drivers may wish to achieve the best fuel economy and emissions performance possible whilst driving the vehicle 2. Such drivers may therefore wish for the engine to be shut down automatically every time that it is possible to gain a benefit in fuel economy or vehicle emissions, regardless of whether the operation of any auxiliary systems of the vehicle may be affected. However, even when the driver wishes for the engine 4 to be shut down automatically as often as possible, it may remain undesirable for the engine 4 to be shut down under conditions in which the safe, continued operation of the engine 4 and/or vehicle 2 may be affected, e.g. restricted, by shutting down the engine.

Due to the differences in driver preferences, it may be desirable to enable the driver to select an operating condition of the start-stop system 100 according to their preferences. The operating condition of the start-stop system 100 may be selected from a first operating condition, in which the start-stop system is prevented from shutting down the engine of the motor vehicle when one or more critical inhibitors are active and a second operating condition, in which the start-stop system is prevented from shutting down the engine of the motor vehicle when one or more critical or non-critical inhibitors are active. The first operating condition can be selected by the driver when the start-stop system may be being prevented from shutting down the engine due to one or more non-critical inhibitors being active, in order to force the engine to be shut down (provided that no critical inhibitors are active).

When, e.g. at the point that, the first operating condition is selected by the driver, the start-stop system determines whether the engine should be shut down, e.g. whether one or more pre-determined engine start-stop conditions have been achieved and whether any critical inhibitors are active. If no critical inhibitors are active, the engine is shut down, regardless of any non-critical inhibitors being active. In other words, any active non-critical inhibitors are overridden. Once the start-stop system has determined whether to shut down the engine, and has shut down the engine if appropriate, the start-stop system may return to the second operating condition. In other words, the second operating condition may be a default operating condition of the start-stop system. The first operating condition may be referred to as a forced engine shut down operating condition.

In an alternative arrangement, when the first operating condition is selected by the driver, the start-stop system may continue operating under the first operating condition until an alternative operating condition is selected by the driver.

As mentioned above, some drivers may find start-stop systems annoying and may wish to deactivate the start-stop system. The start-stop system 100 may therefore have a third operating condition, in which the start-stop system is prevented from shutting down the engine 4, e.g. in which the start-stop system is deactivated. When the third operating condition is selected, the start-stop system may continue operating under the third operating condition until an alternative operating condition is selected.

It will be appreciated, that in some situations, the stop-start system may be prevented from shutting down the engine due to one or more critical inhibitors being active or if the pre-determined start-stop condition has not been achieved. In this case, the engine is not shut down when the driver selects the first operating condition.

The operating condition may be selected using a switch, e.g. a multi-position switch, provided on a dashboard or console of the vehicle. Dashboards and consoles of vehicles often have multiple buttons and switches to allow occupants of the vehicle to control systems of the motor vehicle. In some arrangements, it may be undesirable to provide an additional switch to enable the operating condition of the start-stop system 100 to be selected. In this case, the operating condition of the start-stop system 100 may be selected using an existing control. For example, the operating condition may be selected by operating an existing button, e.g. provided for activating and deactivating the start-stop system. Varying the amount of time that the button is depressed, or by repeatedly operating the button a different number of times may allow the different operating conditions to be selected. For example, a button for activating the start-stop system 100 may be held down for 2 seconds or pressed twice within a predetermined period in order to select the first operating condition.

Alternatively, the operating condition of the start-stop system may be selected by using an existing driving control 14 and operating the driving control in an atypical manner, e.g. in a way that a driver would not typical use the control whilst driving. For example, depressing the clutch pedal 14c twice within a predetermined period of time whist the drive system 10 is in a neutral gear may select a particular operating condition of the start-stop system 100, such as the first operating condition. Alternatively, again, the operating condition of the start-stop system may be selected via an on-board computing device of the motor vehicle, e.g. a trip computer, using a user interface device provided for operating the on-board computing device.

As described above, the first operating condition may be selected by the driver in order to force the start-stop system 100 to shut down the engine at a particularly point when engine shut down may otherwise be prevented due to one or more non-critical inhibitors being active. In other words, the first operating condition may be selected to override one or more non-critical inhibitors that may be active. The start-stop system may then return to operating under the second operating condition. Alternatively, the start-stop system 100 may continue operating under an operating condition selected by the driver until an alternative operating condition is selected by the driver. In such arrangements, the controls used to select an operating condition may be used to alternate between the operating conditions of the start-stop system.

In some arrangements of the present disclosure, the vehicle 2 may have two or more vehicle operating modes. For example, the vehicle may have a first vehicle operating mode, e.g. an "economic mode", in which the operation of systems of the vehicle is controlled to improve or maximize the efficiency of operation of the motor vehicle 2. The vehicle 2 may have a second operating mode, e.g. a "performance mode", in which the operation of systems of the vehicle is controlled in order to improve or maximize performance of the vehicle. In some arrangements, the operating condition of the start-stop system 100 may be set according to the operating mode of the motor vehicle 2. For example, when the motor vehicle 2 is operating in the economic mode, the start-stop system 100 may be set to operate under its first operating condition. When the motor vehicle 2 is operating in the performance mode, the start-stop system 100 may be set to operate under its second or third operating condition.

With reference to FIG. 1, a vehicle 2, such as a motor vehicle, comprises an engine 4, an engine starter 6, powered by a battery 8, and a drive system 10, configured to transmit power from the engine 4 to wheels 12 of the vehicle in order to drive the motor vehicle. In the arrangement show in FIG. 1, the drive system 10 is a conventional, e.g. non-hybrid, drive system. However, it is also envisaged that in other arrangements of the present disclosure, the drive system may be a hybrid drive system and the vehicle may comprise one or more electric motors configured to provide power to the drive system 10.

The drive system 10 may comprise a clutch 10a, configured to operatively couple the engine 4 to the drive system 10, and a gear box 10b, configured to allow a gear ratio between the engine 4 and the wheels 12 to be selectively varied.

The vehicle 2, further comprises a brake system 20 that can be operated by a driver of the vehicle 2 to decelerate the vehicle. In the arrangement depicted, the brake system 20 is a hydraulic brake system comprising a brake servo 22, brake calipers 24 and brake lines 26 configured to carry brake fluid between the brake servo 22 and the brake calipers 24. The brake system 20 may be configured such that a braking force provided by the brake system varies according to the pressure of brake fluid within the system, e.g. within the brake lines 26. Alternatively, the brake system 20 may comprise any other desirable type of brake system.

The vehicle 2 further comprises driving controls 14, such as an accelerator pedal 14a, a brake pedal 14b and a clutch pedal 14c. The driving controls 14 may be operated by a driver of the vehicle in order to control the operation of the vehicle. In particular, the driver may operate the accelerator pedal 14a to control the amount of torque provided by the engine, the clutch pedal 14c may be used to control the operation of the clutch 10a to couple and decoupled the engine 4 and the drive system 10, and the brake pedal 14b may be operated to control the braking force supplied by the brake system, e.g. by controlling the pressure of brake fluid within the brake system 20.

The vehicle 2 further comprises a start-stop system 100. The start-stop system is configured to control the operation of the engine 4 and the engine starter 6 to shut down the engine 4 automatically according to one or more predetermined start-stop conditions. For example, the start-stop system 100 may be configured to shut down the engine 4 when the velocity of the motor vehicle drops below a threshold value, e.g. when the vehicle stops. Additionally, or alternatively, the start-stop system 100 may be configured to shut down the engine 4 when the brake pedal 14b has been operated such that a braking force provided by the brake system 20 exceeds a threshold level.

The start-stop system 100 is further configured to restart the engine 4 of the motor vehicle 2 automatically, e.g. by operating the engine starter 6, according to one or more further predetermined start-stop conditions. Such further start-stop conditions may indicate that the driver is attempting or preparing to accelerate the vehicle. For example, the start-stop system 100 may be configured to restart the engine when the clutch pedal is depressed whilst the drive system 10 is in a neutral gear. Additionally, or alternatively, the start-stop system may be configured to restart the engine 4 when the brake pedal is being operated such that the braking force provided by the brake system 20 is less than the threshold level or a further threshold level.

The start-stop system 100 may comprise a controller 102 configured to determine when to shut down and restart the engine and to control the operation of the engine 4 and the engine starter 6 accordingly. The controller 102 may be a dedicated controller of the start-stop system 100. Alternatively, the controller 102 may be provided as part of one or more other systems of the vehicle, such as an engine assembly or powertrain of the vehicle. For example, the controller 102 may be an engine control unit or a powertrain control module. Alternatively, the controller 102 may be another controller of the vehicle, such as a body control module.

The vehicle 2 may comprise one or more sensors 16 configured to monitor the operation of the vehicle. The sensors 16 may be operatively coupled to the controller 102 and may provide sensor readings to the controller 102 for the start-stop system to determine whether the engine 4 should be shut down or restarted automatically. For example, as depicted in FIG. 1, the vehicle 2 may comprise a brake sensor 16a configured to determine the braking force being applied by the brake system 20. The brake sensor 16a may measure a pressure of brake fluid within the brake system 20 or may determine the position of the brake pedal 14b in order to determine the braking force being applied. The vehicle 2 may further comprise a clutch sensor 16b configured to determine when the clutch pedal 14c is being depressed to decouple the drive system 10 from the engine 4. The vehicle may further comprise a gear sensor 16c configured to determine a gear setting of the drive system 10, e.g. whether the gear box 10b of the drive system 10 is in a neutral gear.

The components and systems of the vehicle 2 described above, such as the engine 4, the engine starter 6, the battery 8 and the brake system 20, may be referred to as primary vehicle systems, as they directly relate to the operation of the engine 4 of the motor vehicle or to the safety of occupants of the motor vehicle during its operation.

If one or more of the primary systems of the vehicle is inactive, e.g. unable to operate, has a fault, or is operating under an operating condition that may affect safe, continued operation of the engine 4 and/or vehicle 2, it may be undesirable for the engine 4 of the vehicle to be shut down automatically. For example, shutting down the engine 4 in such circumstances may result in the start-stop system 100 being unable to restart the engine 4, which may result in the vehicle 2 being stranded in the road.

Each of the primary systems of the vehicle 2 may be configured to provide an inhibitor signal to the start-stop system 100, e.g. to the controller 102, to indicate that the start-stop system should not automatically shut down the engine 4 when the operating conditions of the system may affect safe, continued operation of the engine 4 and/or vehicle 2, e.g. following the engine being shut down.

The inhibitor signals generated by the primary systems of the vehicle 2 that may affect safe, continued operation of the engine 4 and/or vehicle 2 may be referred to as critical inhibitors. Critical inhibitors that may be active may correspond to a low charge state of the battery 8 or a battery fault, an engine fault, an engine starter fault, an inadequate brake servo vacuum level or any other fault or condition of the vehicle that may prevent the engine 4 from being restarted and/or may affect safe operation of the vehicle 2. The start-stop system 100 may be prevented from shutting down the engine 4 when one or more critical inhibitors are active.

It may also be undesirable for the engine to be automatically shut down when one or more of the primary systems are operating under other operating conditions that do not affect safe operation of the engine and/or vehicle. For example, during engine warm-up, when the engine 4 is operating at a temperature below a predetermined threshold temperature, it may be undesirable for the engine to be shut down automatically. Additionally, if the start-stop system 100 has recently, e.g. within a predetermined period of time, automatically restarted the engine, it may be undesirable for the engine to be shut down again even if a predetermine start-stop condition is met, e.g. in order to avoid the start-stop system acting as an annoyance to the driver.

Under such operating conditions, the primary systems may be configured to provide further inhibitor signals to the start-stop system. As operating under such conditions does not affect safe operation of the engine 4 and/or vehicle 2, the further inhibitor signals may be referred to as non-critical inhibitors. The start-stop system 100 may be prevented from shutting down the engine 4 when one or more non-critical inhibitors are active.

As depicted in FIG. 1, the vehicle 2 may further comprise one or more auxiliary systems 30, such as a climate control system 32, a media system 34 and a power supply system 36, configured to provide power to one or more occupant devices coupled to power take-off ports provided on the vehicle 2.

When the engine 4 of the vehicle is shut down, the operation of the auxiliary systems 30 may be affected, e.g. restricted. Hence, when one or more of the auxiliary systems 30 are active, it may be desirable to prevent the start-stop system 100 from automatically shutting down the engine 4.

The auxiliary systems 30 may each be configured to provide an inhibitor signal to the start-stop system 100, e.g. to the controller 102, when their operation may be restricted by shutting down the engine. For example, the climate control system 32 may provide an inhibitor signal when it is operating or when an interior temperature of the vehicle is outside a predetermine range of temperatures. As the auxiliary systems 30 do not affect continued, safe operation of the vehicle, the inhibitor signals generated by the auxiliary systems may be non-critical inhibitors.

Different drivers of the motor vehicle 2 may have different preferences for using the start-stop system 100. For example, some drivers may find the start-stop system 100 an annoyance and may be liable to deactivate the start-stop system. In order to deter such drivers from deactivating the start-stop system and to provide some benefits in fuel consumption and emissions from automatically shutting down the vehicle. The start-stop system 100 may be configured to prevent the engine 4 from being shut down automatically whenever a critical or non-critical inhibitor is active. In other words, the start-stop system may be configured to prevent the engine 4 from being shut down automatically whenever a primary or auxiliary system of the vehicle is providing or has provided a signal to the start-stop system 100 indicating that shutting down the engine 4 may detrimentally affect the operation of that system.

Other drivers may wish to achieve the best fuel economy and emissions performance possible whilst driving the vehicle 2. Such drivers may therefore wish for the engine to be shut down automatically every time that it is possible to gain a benefit in fuel economy or vehicle emissions, regardless of whether the operation of any auxiliary systems of the vehicle may be affected. However, even when the driver wishes for the engine 4 to be shut down automatically as often as possible, it may remain undesirable for the engine 4 to be shut down under conditions in which the safe, continued operation of the engine 4 and/or vehicle 2 may be affected, e.g. restricted, by shutting down the engine.

Due to the differences in driver preferences, it may be desirable to enable the driver to select an operating condition of the start-stop system 100 according to their preferences. The operating condition of the start-stop system 100 may be selected from a first operating condition, in which the start-stop system is prevented from shutting down the engine of the motor vehicle when one or more critical inhibitors are active and a second operating condition, in which the start-stop system is prevented from shutting down the engine of the motor vehicle when one or more critical or non-critical inhibitors are active. The first operating condition can be selected by the driver when the start-stop system may be being prevented from shutting down the engine due to one or more non-critical inhibitors being active, in order to force the engine to be shut down (provided that no critical inhibitors are active).

When, e.g. at the point that, the first operating condition is selected by the driver, the start-stop system determines whether the engine should be shut down, e.g. whether one or more pre-determined engine start-stop conditions have been achieved and whether any critical inhibitors are active. If no critical inhibitors are active, the engine is shut down, regardless of any non-critical inhibitors being active. In other words, any active non-critical inhibitors are overridden. Once the start-stop system has determined whether to shut down the engine, and has shut down the engine if appropriate, the start-stop system may return to the second operating condition. In other words, the second operating condition may be a default operating condition of the start-stop system. The first operating condition may be referred to as a forced engine shut down operating condition.

In an alternative arrangement, when the first operating condition is selected by the driver, the start-stop system may continue operating under the first operating condition until an alternative operating condition is selected by the driver.

As mentioned above, some drivers may find start-stop systems annoying and may wish to deactivate the start-stop system. The start-stop system 100 may therefore have a third operating condition, in which the start-stop system is prevented from shutting down the engine 4, e.g. in which the start-stop system is deactivated. When the third operating condition is selected, the start-stop system may continue operating under the third operating condition until an alternative operating condition is selected.

Figure 2:
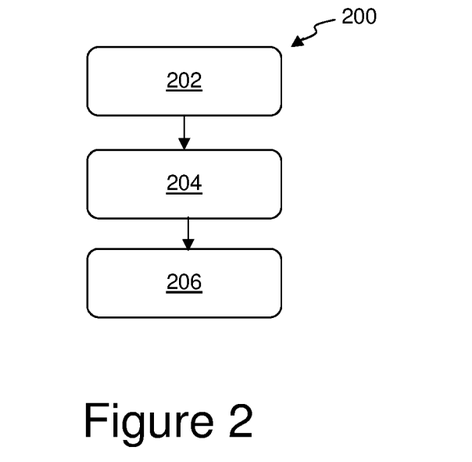
FIG. 2 shows a method of operating a vehicle, according to arrangements of the present disclosure.

With reference to FIG. 2, a motor vehicle comprising the start-stop system 100 may be operated using a method 200 according to arrangements of the present disclosure. The method comprises a first step 202, in which the operating condition of the start-stop system is selected. As described above, the operating condition of the start-stop system may be selected by an occupant of the vehicle, e.g. the driver, according to their preferences. In particular, the driver can select the first operating condition when a non-critical inhibitor may be preventing the start-stop system 100 from shutting down the engine automatically, to force the engine to be shut down, in order to improve the fuel economy of the vehicle.

It will be appreciated, that in some situations, the stop-start system may be prevented from shutting down the engine due to one or more critical inhibitors being active or if the pre-determined start-stop condition has not been achieved. In this case, the engine is not shut down when the driver selects the first operating condition.

The operating condition may be selected using a switch, e.g. a multiposition switch, provided on a dashboard or console of the vehicle. Dashboards and consoles of vehicles often have multiple buttons and switches to allow occupants of the vehicle to control systems of the motor vehicle. In some arrangements, it may be undesirable to provide an additional switch to enable the operating condition of the start-stop system 100 to be selected. In this case, the operating condition of the start-stop system 100 may be selected using an existing control. For example, the operating condition may be selected by operating an existing button, e.g. provided for activating and deactivating the start-stop system. Varying the amount of time that the button is depressed, or by repeatedly operating the button a different number of times may allow the different operating conditions to be selected. For example, a button for activating the start-stop system 100 may be held down for 2 seconds or pressed twice within a predetermined period in order to select the first operating condition.

Alternatively, the operating condition of the start-stop system may be selected by using an existing driving control 14 and operating the driving control in an atypical manner, e.g. in a way that a driver would not typical use the control whilst driving. For example, depressing the clutch pedal 14c twice within a predetermined period of time whist the drive system 10 is in a neutral gear may select a particular operating condition of the start-stop system 100, such as the first operating condition. Alternatively again, the operating condition of the start-stop system may be selected via an on-board computing device of the motor vehicle, e.g. a trip computer, using a user interface device provided for operating the on-board computing device.

As described above, the first operating condition may be selected by the driver in order to force the start-stop system 100 to shut down the engine at a particularly point when engine shut down may otherwise be prevented due to one or more non-critical inhibitors being active. In other words, the first operating condition may be selected to override one or more non-critical inhibitors that may be active. The start-stop system may then return to operating under the second operating condition. Alternatively, the start-stop system 100 may continue operating under an operating condition selected by the driver until an alternative operating condition is selected by the driver. In such arrangements, the controls used to select an operating condition may be used to alternate between the operating conditions of the start-stop system.

In some arrangements of the present disclosure, the vehicle 2 may have two or more vehicle operating modes. For example, the vehicle may have a first vehicle operating mode, e.g. an "economic mode", in which the operation of systems of the vehicle is controlled to improve or maximize the efficiency of operation of the motor vehicle 2. The vehicle 2 may have a second operating mode, e.g. a "performance mode", in which the operation of systems of the vehicle is controlled to improve or maximize performance of the vehicle. In some arrangements, the operating condition of the start-stop system 100 may be set according to the operating mode of the motor vehicle 2. For example, when the motor vehicle 2 is operating in the economic mode, the start-stop system 100 may be set to operate under its first operating condition. When the motor vehicle 2 is operating in the performance mode, the start-stop system 100 may be set to operate under its second or third operating condition.

The method 200 further comprises a second step 204, in which the engine 4 of the vehicle 2 is shut down when a pre-determined start-stop condition is achieved. For example, the engine of the motor vehicle may be shut down when a velocity of the motor vehicle is below a threshold value and/or when the driver operates the brake system 20 to apply a predetermined braking force. Shutting down of the engine 4 may only be performed if shut down is permitted by the selected operating condition of the start-stop system 100, e.g. if no critical inhibitors are active or if no critical or non-inhibitors are active.

In some cases, the pre-determined start-stop condition may be achieved, e.g. first achieved, when the start-stop system is operating under the second operating condition, and hence, shut down of the engine is prevented if one or more non-critical inhibitors are active. The driver can then select the first operating condition, e.g. after the pre-determined start-stop condition has already been achieved, in order to override the non-critical inhibitors to force the engine to be shut down in the second step 204 (unless one or more critical inhibitors are active).

In a third step 206 of the method, the engine may be restarted when the driver of the vehicle 2 is attempting or preparing to accelerate the vehicle, e.g. when the driver depresses the clutch pedal 14c of the vehicle whilst the drive system is in a neutral gear or presses the accelerator pedal 14a. The engine may be restarted regardless of the operating condition of the start-stop system or the number of critical and/or non-critical inhibitors that are active.

As mentioned above, one of the non-critical inhibitors of the start-stop system 100 may correspond to the engine 4 having recently been restarted. Hence, when the engine is restarted in the third step 206, the corresponding non-critical inhibitor may be activated. The non-critical inhibitor may remain active until a pre-determined period of time has passed following the engine 4 being restarted. Alternatively, the non-critical inhibitor corresponding to the engine being restarted may be deactivated when the vehicle has accelerated to above a threshold speed, e.g. if the vehicle reaches the threshold speed before the predetermined period elapses.

It will be appreciated by those skilled in the art that although the invention has been described by way of example, with reference to one or more exemplary examples, it is not limited to the disclosed examples and that alternative examples could be constructed without departing from the scope of the invention as defined by the appended claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
an engine; and
a start-stop system configured to control automatic stopping and restarting of the engine responsive to a first category of operating conditions when operating in a first start-stop mode, and both the first category of operating conditions and a second category of operating conditions when operating in a second start-stop mode, wherein one of the start-stop operating modes is selected responsive to input from a vehicle user interface, and wherein the start-stop system is inhibited from shutting down the engine in response to a third operating mode selected responsive to the input from the vehicle user interface.

2. The vehicle of claim 1 wherein the vehicle user interface comprises a switch or button and the start-stop operating mode is selected responsive to a signal from the switch or button.

3. The vehicle of claim 1 wherein the vehicle user interface comprises a clutch or an accelerator pedal and the start-stop operating mode is selected responsive to a signal from the clutch or the accelerator pedal.

4. The vehicle of claim 1 wherein the first category of operating conditions comprises at least one of: a low battery state, an engine fault, an engine starter fault, and a battery fault.

5. The vehicle of claim 1 wherein the second category of operating conditions comprises at least one of: a vehicle climate control system being active, an ambient temperature of a vehicle interior being outside a predetermined range, an engine temperature being below a threshold value, the engine having recently been restarted, a vehicle media system being active, and a power take-off port of the vehicle being in use.

6. The vehicle of claim 1 wherein the start-stop system is configured to select the first start-stop mode of the start-stop system following a predetermined atypical operation of a driving control of the vehicle.

7. The vehicle of claim 1 wherein the start-stop system is operating in the first start-stop mode and is configured to restart the engine automatically responsive to releasing a vehicle brake pedal or pressing a vehicle accelerator pedal, and to inhibit stopping the engine in response to the first category of operating conditions for a predetermined time period after restarting the engine.

8. The vehicle of claim 7 wherein the start-stop system is further configured to inhibit stopping the engine in response to the first category of operating conditions after restarting until vehicle speed exceeds an associated threshold.

9. A method of operating a vehicle engine start-stop system, comprising:
   initiating one of first and second start-stop modes;
   by a controller:
      inhibiting engine shutdown when operating in the first start-stop mode only in response to a first plurality of predetermined operating conditions; and
      inhibiting engine shutdown when operating in the second start-stop mode in response to the first plurality or a second plurality of predetermined operating conditions different from the first plurality, wherein initiating one of the first and second start-stop modes comprises detecting, by the controller, predetermined atypical manipulation of vehicle driving controls.

10. The method of claim 9 wherein initiating one of the first and second start-stop modes comprises receiving an input by the controller from an associated vehicle switch or button.

11. The method of claim 9 wherein initiating one of the first and second start-stop modes comprises detecting atypical manipulation of a vehicle brake pedal, clutch pedal, or accelerator pedal.

12. The method of claim 9 wherein the first plurality of operating conditions comprises at least one of: a low battery state, an engine fault, an engine starter fault, and a battery fault.

13. The method of claim 9 wherein the second plurality of operating conditions comprises at least one of: a vehicle climate control system being active, an ambient temperature of a vehicle interior being outside a predetermined range, an engine temperature being below a threshold value, the engine having recently been restarted, a vehicle media system being active, and a power take-off port of the vehicle being in use.

14. A vehicle comprising:
   an engine;
   a user interface configured to select a start-stop mode an accelerator pedal;
   a brake pedal; and
   a controller communicating with the engine and the user interface and configured to automatically shutdown and restart the engine, and to inhibit automatic engine shutdown or restart responsive to any of a first group of inhibitors, or alternatively, any of the first group and a second group of inhibitors depending on the start-stop mode selected via manipulation of the accelerator pedal, or the brake pedal.

15. The vehicle of claim 14 wherein the vehicle further comprises a clutch pedal, and wherein the start-stop mode is selected via manipulation of the clutch pedal.

16. The vehicle of claim 14 wherein the controller is further configured to inhibit automatic engine shutdown until vehicle speed exceeds an associated threshold.

17. The vehicle of claim 14 wherein the user interface comprises a vehicle switch or button.

* * * * *